(12) United States Patent
Kim et al.

(10) Patent No.: US 10,764,929 B2
(45) Date of Patent: Sep. 1, 2020

(54) METHOD AND APPARATUS FOR REQUESTING SYSTEM INFORMATION

(71) Applicant: LG ELECTRONICS INC., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,348

(22) PCT Filed: Jan. 24, 2018

(86) PCT No.: PCT/KR2018/001067
§ 371 (c)(1),
(2) Date: Jun. 20, 2018

(87) PCT Pub. No.: WO2018/139852
PCT Pub. Date: Aug. 2, 2018

(65) Prior Publication Data
US 2020/0029365 A1    Jan. 23, 2020

Related U.S. Application Data

(60) Provisional application No. 62/450,568, filed on Jan. 26, 2017, provisional application No. 62/491,360, filed on Apr. 28, 2017.

(51) Int. Cl.
*H04W 74/08* (2009.01)
*H04W 48/14* (2009.01)
(Continued)

(52) U.S. Cl.
CPC ....... *H04W 74/0833* (2013.01); *H04W 48/14* (2013.01); *H04W 72/1289* (2013.01); *H04W 74/006* (2013.01); *H04W 74/008* (2013.01)

(58) Field of Classification Search
CPC ............. H04W 74/0833; H04W 74/08; H04W 74/008; H04W 76/006; H04W 48/14;
(Continued)

(56) References Cited

U.S. PATENT DOCUMENTS 9,438,366 B2    9/2016  Luo et al.
2007/0115872 A1 *  5/2007  Kim ...................... H04W 52/44
                                                            370/318
(Continued)

FOREIGN PATENT DOCUMENTS

KR    1020130041300       2/2009
KR    1020110113484      10/2011
(Continued)

OTHER PUBLICATIONS

Extended European Search Report in European Application No. 18742694.5, dated Jul. 15, 2019, 13 pages.
(Continued)

*Primary Examiner* — Warner Wong
(74) *Attorney, Agent, or Firm* — Fish & Richardson P.C.

(57) ABSTRACT

Provided are a method for requesting, by a user equipment (UE), system information in a wireless communication system and a device supporting the same. The method may include: initiating a random access procedure; requesting system information from a base station (BS) in the initiated random access procedure; receiving, from the BS, a broadcast indication indicating that the requested system information is broadcast in the initiated random access procedure after requesting the system information from the BS; and stopping the initiated random access procedure.

15 Claims, 20 Drawing Sheets

(51) Int. Cl.
*H04W 72/12* (2009.01)
*H04W 74/00* (2009.01)

(58) Field of Classification Search
CPC ... H04W 72/1289; H04W 44/00; H04W 4/20; H04W 4/16; H04W 4/185; H04L 47/35; H04L 67/147; H04L 27/345; H04L 29/12575; H04L 2212/10
See application file for complete search history.

(56) References Cited

U.S. PATENT DOCUMENTS

| | | | |
|---|---|---|---|
| 2009/0219860 A1 | 9/2009 | Tanno et al. | |
| 2009/0232095 A1* | 9/2009 | Ahn | H04W 74/006 370/331 |
| 2009/0238366 A1* | 9/2009 | Park | H04W 74/002 380/270 |
| 2009/0239545 A1* | 9/2009 | Lee | H04W 74/002 455/450 |
| 2010/0002590 A1* | 1/2010 | Park | H04W 74/006 370/241 |
| 2010/0067412 A1* | 3/2010 | Kitazoe | H04L 1/1812 370/294 |
| 2010/0120452 A1 | 5/2010 | Somasundaram et al. | |
| 2011/0286420 A1* | 11/2011 | Cho | H04W 74/004 370/329 |
| 2011/0299415 A1* | 12/2011 | He | H04W 74/0833 370/252 |
| 2012/0147830 A1* | 6/2012 | Lohr | H04L 1/1854 370/329 |
| 2012/0263039 A1* | 10/2012 | Ou | H04W 28/0205 370/235 |
| 2014/0192775 A1* | 7/2014 | Li | H04W 76/15 370/331 |
| 2014/0211685 A1* | 7/2014 | Kim | H04W 36/06 370/312 |
| 2016/0227585 A1* | 8/2016 | Yi | H04W 72/1273 |
| 2016/0269163 A1* | 9/2016 | Wong | H04W 72/042 |
| 2016/0309517 A1* | 10/2016 | Park | H04W 56/0005 |
| 2017/0006659 A1 | 1/2017 | Jha et al. | |
| 2018/0139668 A1* | 5/2018 | Takahashi | H04W 74/0833 |
| 2018/0270868 A1* | 9/2018 | Ou | H04W 48/14 |
| 2019/0098670 A1* | 3/2019 | Jia | H04W 76/27 |
| 2019/0104550 A1* | 4/2019 | Yang | H04W 72/04 |
| 2019/0141746 A1* | 5/2019 | Hong | H04W 48/14 |
| 2020/0068623 A1* | 2/2020 | Yan | H04W 56/0045 |

FOREIGN PATENT DOCUMENTS

| | | |
|---|---|---|
| KR | 1020090014937 | 4/2013 |
| WO | WO 2016/163331 A1 | 10/2016 |

OTHER PUBLICATIONS

Samsung, "On Demand SI Delivery: Signaling Aspects," R2-167563, 3GPP TSG-RAN WG2 #96, RENO, USA, Nov. 14-18, 2016, 3 pages.
InterDigital Communications, "Acquisition of Other-SI," R2-1700230, 3GPP TSG-RAN WG2 NR Ad Hoc, Spokane, Washington, Jan. 17-19, 2017, 4 pages.
Catt, "On-demand system information delivery mechanism," R2-1700210, 3GPP TSG-RAN WG2 NR Ad Hoc, Spokane, USA, Jan. 17-19, 2017, 4 pages.
CMCC, "Further considerations on other SI," R2-1700529, 3GPP TSG-RAN WG2 NR Ad Hoc, Spokane, USA, dated Jan. 17-19, 2017, 6 pages.
Intel Corporation, "Msg3 vs. Msg1 for on-demand SI request," R2-1700339. 3GPP TSG-RAN WG2 NR AdHoc Meeting, Spokane, USA, dated Jan. 17-19, 2017, 3 pages.
Japanese Office Action in Japanese Application No. 2019-517841, dated Jun. 16, 2020.9 pages (with English translation).

* cited by examiner

FIG. 18
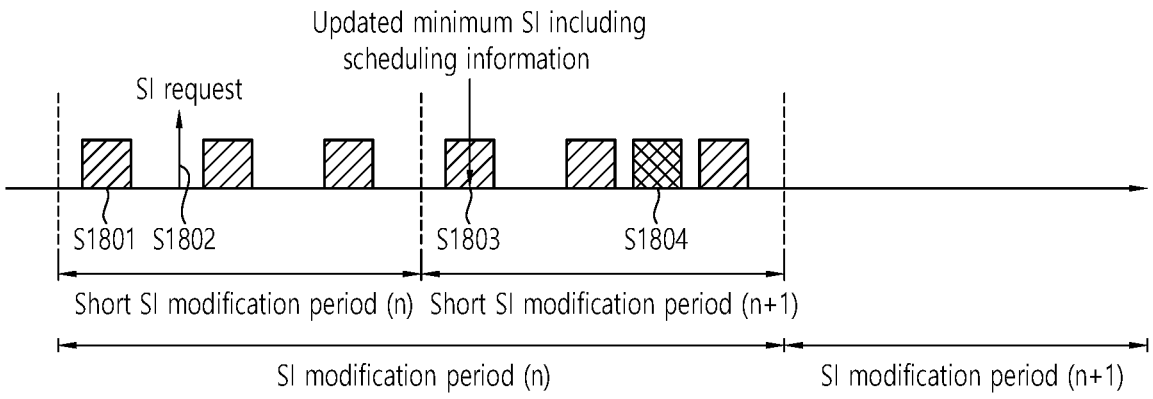
(a)
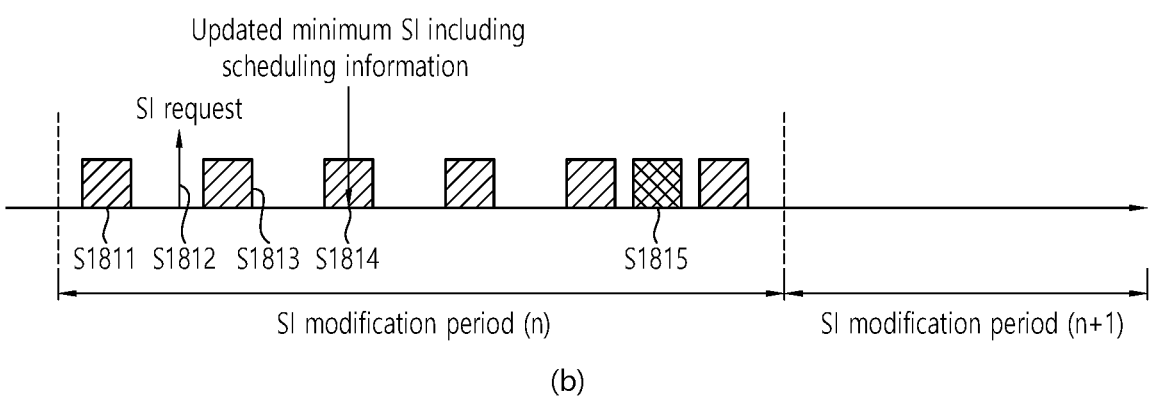
(b)
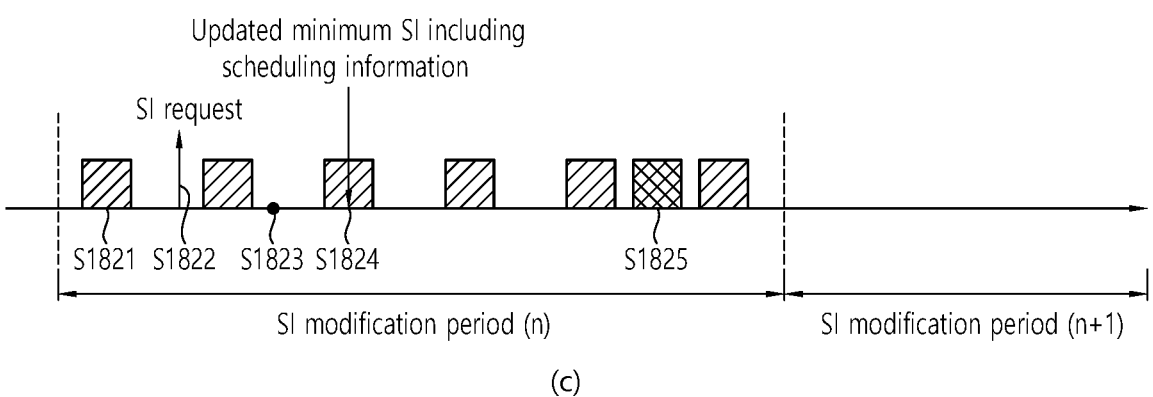
(c)

METHOD AND APPARATUS FOR REQUESTING SYSTEM INFORMATION

CROSS REFERENCE TO RELATED APPLICATIONS

This application is the National Phase of PCT/KR2018/001067 filed on Jan. 24, 2018, which claims priority under 35 U.S.C. § 119(e) to U.S. Provisional Application Nos. 62/450,568 and 62/491,360 filed on Jan. 26, 2017 and Apr. 28, 2017, all of which are hereby expressly incorporated by reference into the present application.

BACKGROUND OF THE INVENTION

Field of the Invention

The present invention relates to a wireless communication system and, more particularly, to a method in which a UE requests other system information and a device supporting the same.

Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

The number of system information blocks is continuously increasing, and radio resources are required to broadcast a system information block. Thus, as the number of system information blocks increases, the quantity of radio resources required to broadcast a system information block also inevitably increases. To transmit continuously increasing system information to a user equipment (UE), it is necessary to propose a method for acquiring system information that efficiently utilizes radio resources.

According to an embodiment, there is provided a method for requesting, by a UE, system information in a wireless communication system. The method may include: initiating a random access procedure; requesting system information from a base station (BS) in the initiated random access procedure; receiving, from the BS, a broadcast indication indicating that the requested system information is broadcast in the initiated random access procedure after requesting the system information from the BS; and stopping the initiated random access procedure.

According to another embodiment, there is provided a UE for requesting system information in a wireless communication system. The UE may include: a memory; a transceiver; and a processor to connect the memory with the transceiver, wherein the processor may: initiate a random access procedure; control the transceiver to request system information from a base station (BS) in the initiated random access procedure; control the transceiver to receive, from the BS, a broadcast indication indicating that the requested system information is broadcast in the initiated random access procedure after requesting the system information from the BS; and stop the initiated random access procedure.

A UE can efficiently receive other system information.

BRIEF DESCRIPTION OF THE DRAWINGS

FIG. 18 shows a method for a UE to acquire updated minimum system information according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
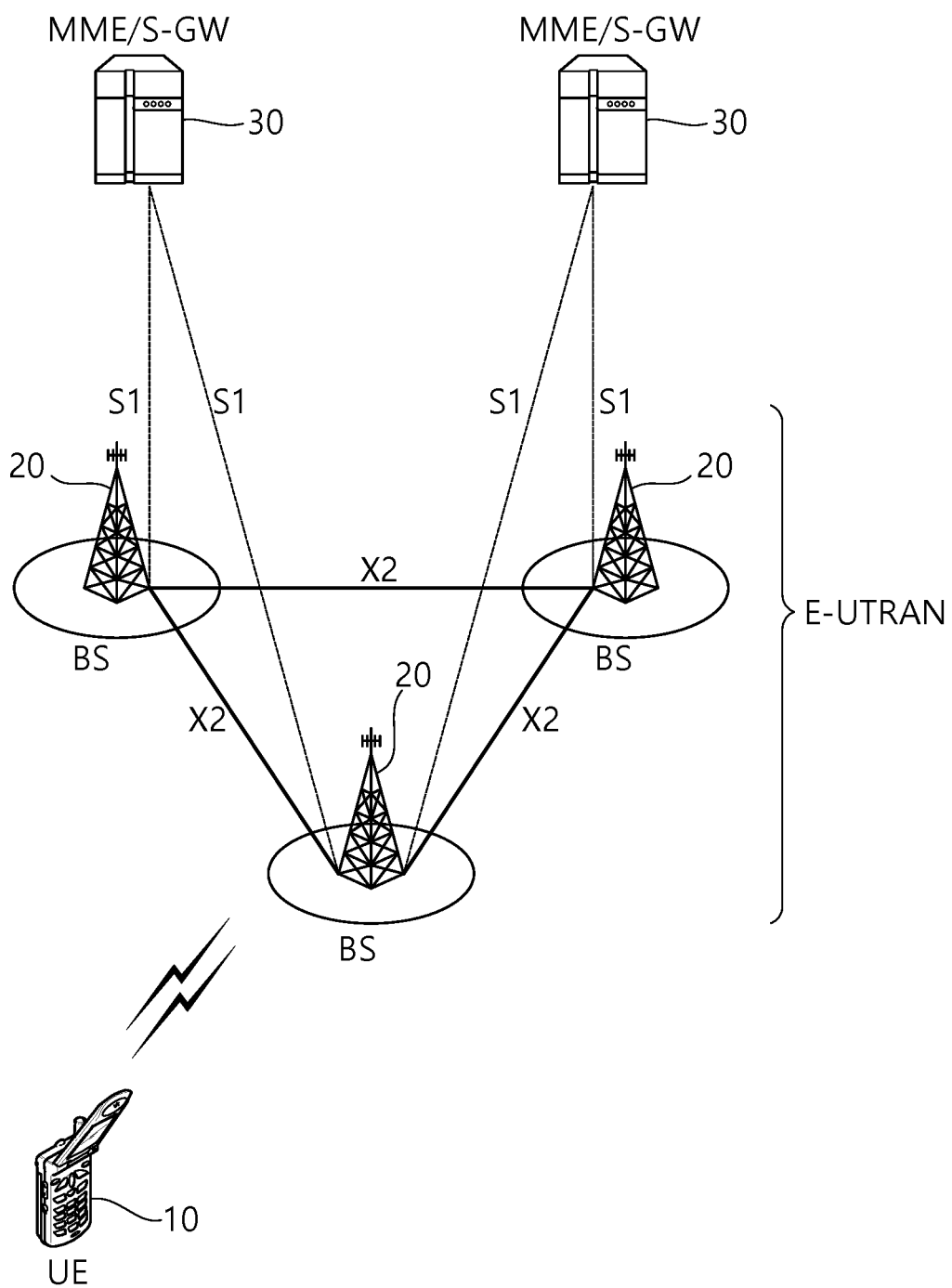
FIG. 1 shows LTE system architecture.

FIG. 1 shows LTE system architecture. The communication network is widely deployed to provide a variety of communication services such as voice over interne protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
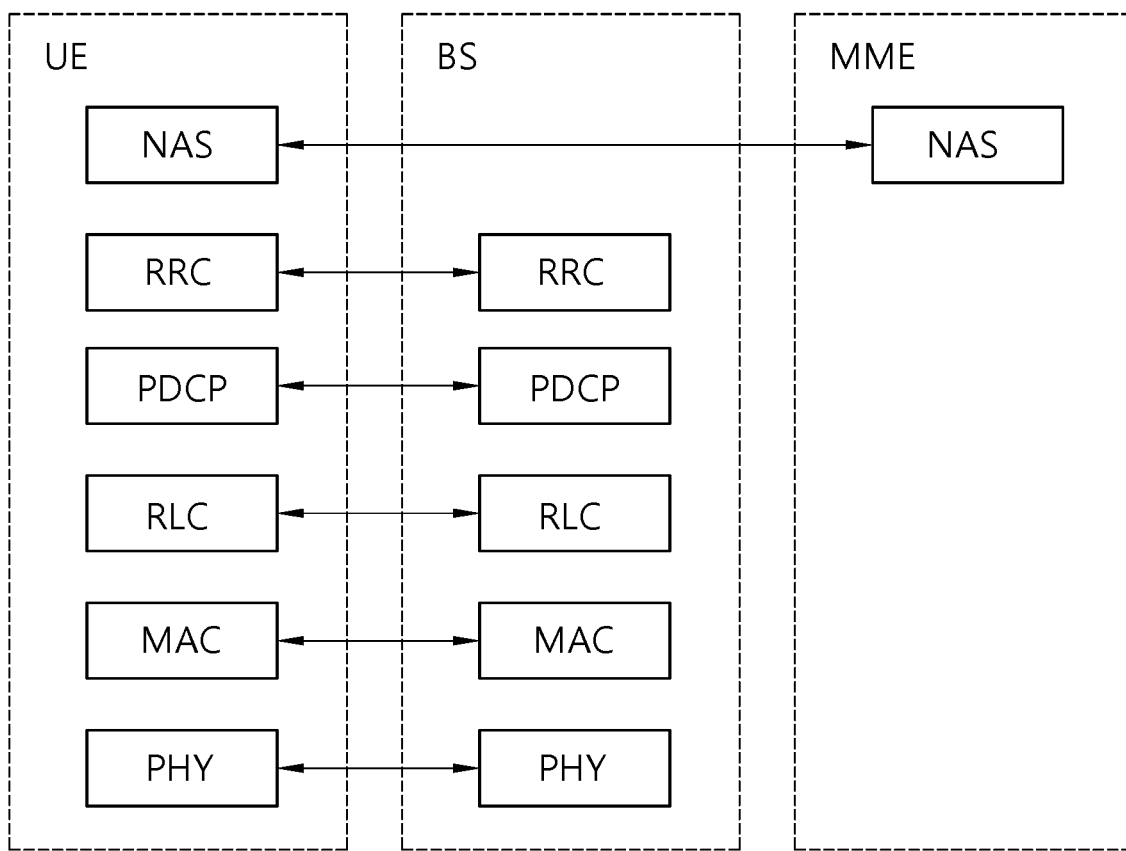
FIG. 2 shows a control plane of a radio interface protocol of an LTE system.
Figure 3:
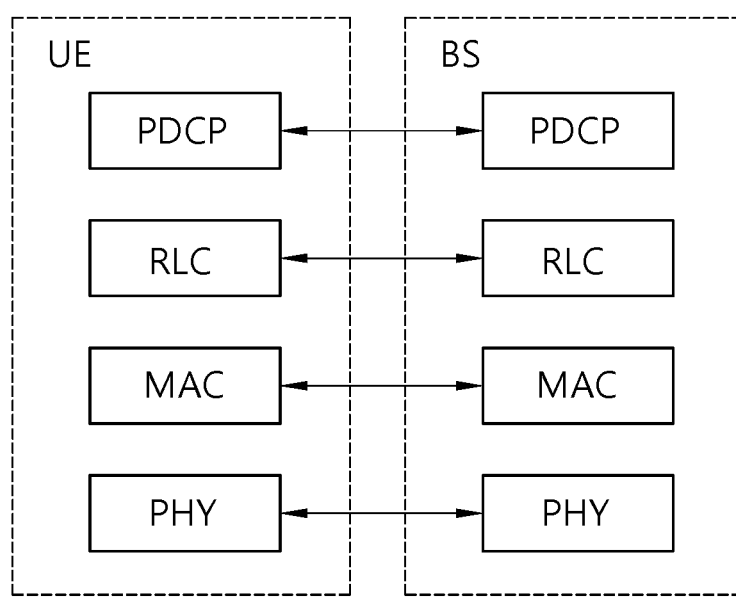
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
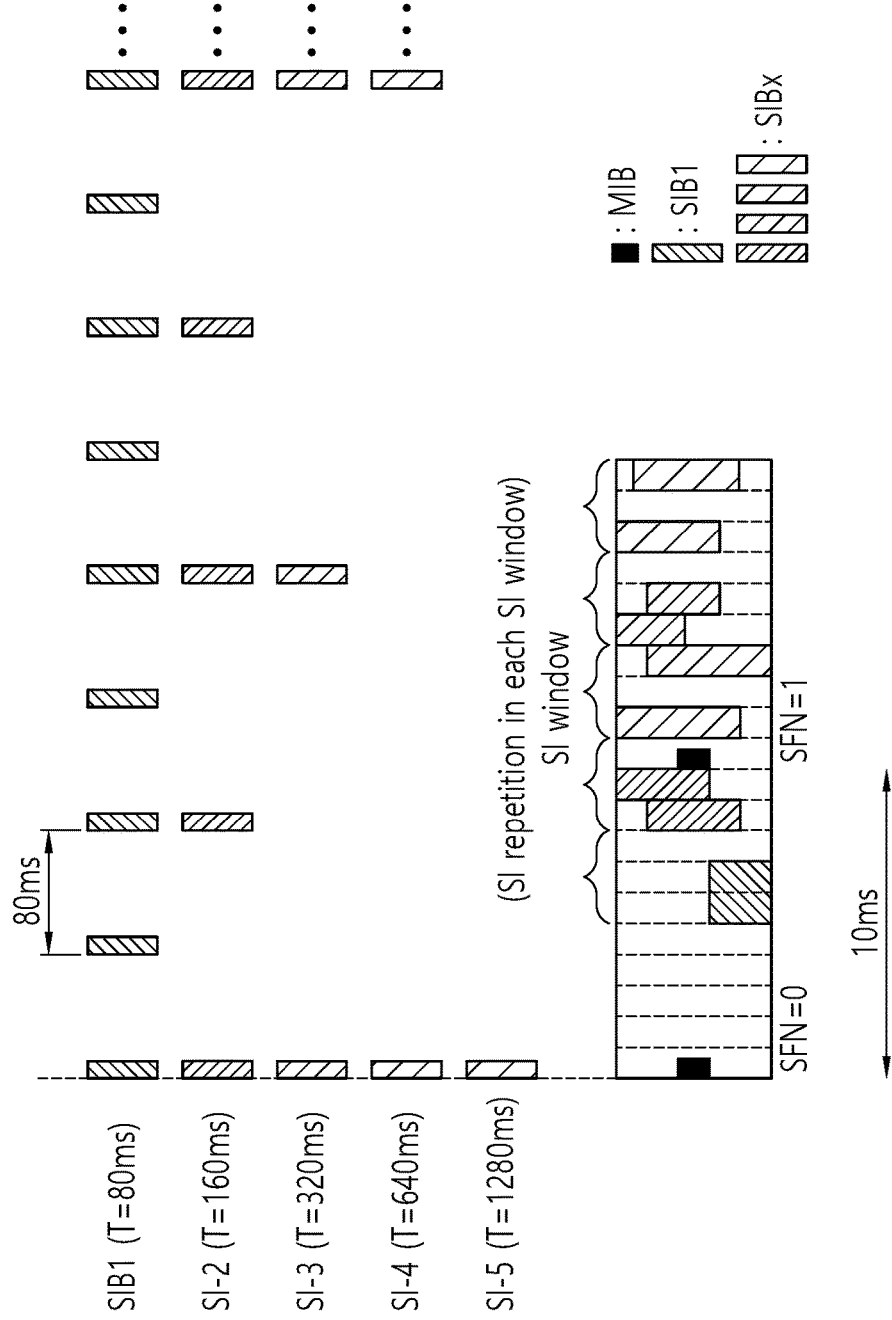
FIG. 4 shows an example of transmitting a master information block (MIB), system information block 1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation.

When system information is changed, UEs need to know in advance the time the BS transmits new system information. In order that a BS and a UE mutually recognize a radio frame period for transmitting new system information, the concept of BCCH modification period is introduced in "3GPP TS 36.331 v9. 3.0," which is described in detail.

Figure 5:
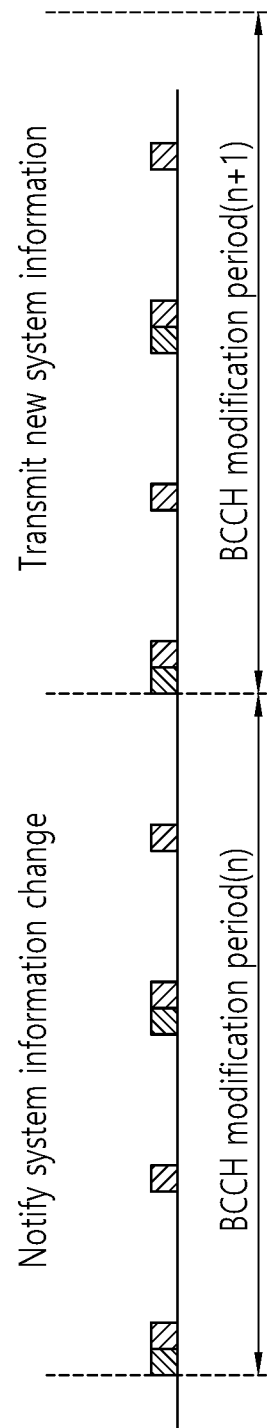
FIG. 5 shows an update of system information.

FIG. 5 shows an update of system information.

Referring to FIG. 5, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

Figure 6:
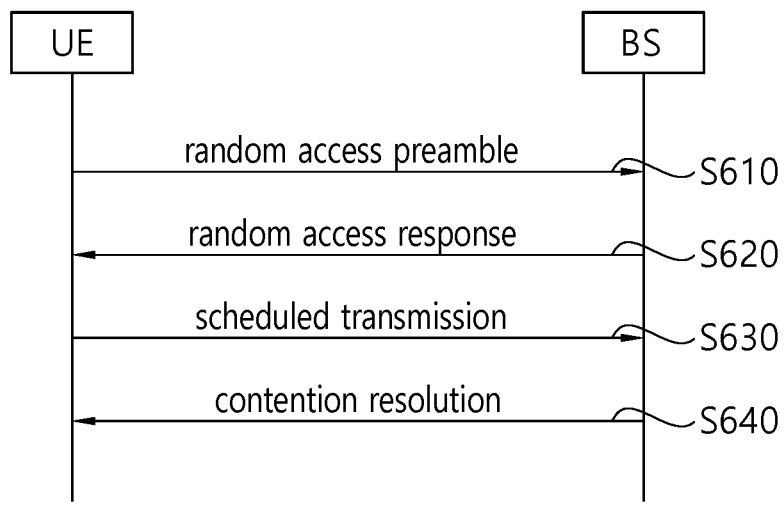
FIG. 6 illustrates a contention-based random access procedure.

FIG. 6 illustrates a contention-based random access procedure.

Referring to FIG. 6, a UE randomly selects one random access preamble from a random access preamble set indicated by system information or a handover command. The UE selects a radio resource for transmitting the random access preamble to transmit the selected random access preamble (S610). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S620). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH on the basis of the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S630). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g, S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S640). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 7:
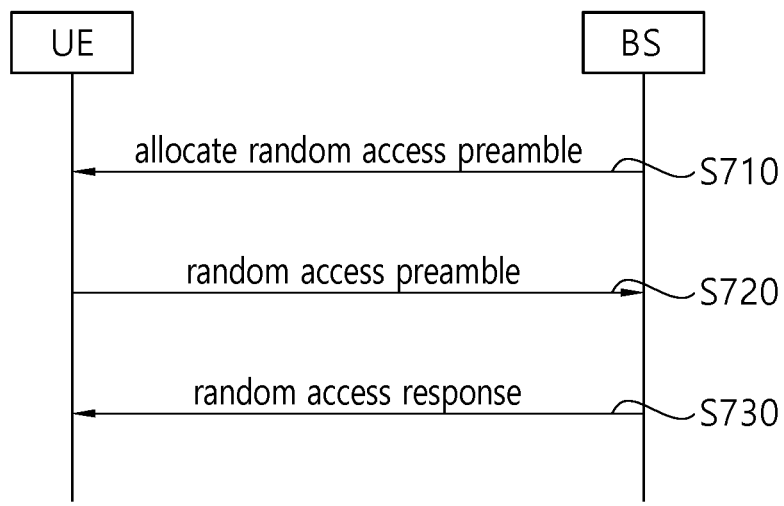
FIG. 7 illustrates a non-contention random access procedure.

FIG. 7 illustrates a non-contention random access procedure.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S710).

After being allocated the random access preamble designated for the UE, the UE transmits the random access preamble to the BS (S720).

Upon receiving the random access preamble, the BS transmits a random access response to the UE in response (S730). A procedure associated with the random access response has been mentioned above in S620 of FIG. 6.

The number of system information blocks is continuously increasing, and radio resources are required to broadcast a system information block. Thus, as the number of system information blocks increases, the quantity of radio resources required to broadcast a system information block also inevitably increases. To solve such a problem, new-type system information is proposed.

Figure 8:
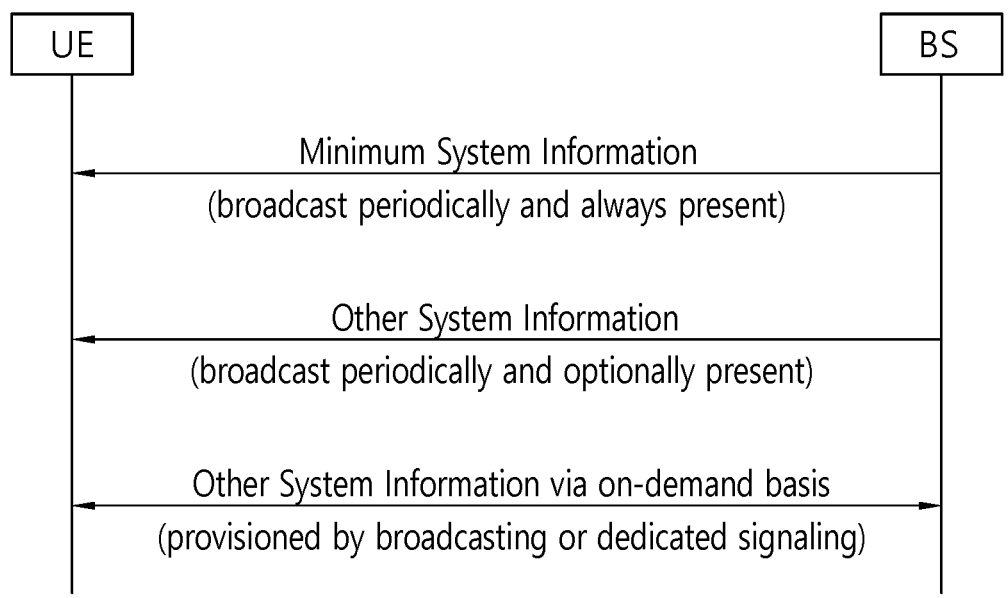
FIG. 8 shows a procedure for a UE to receive new-type system information.

FIG. 8 shows a procedure for a UE to receive new-type system information.

Referring to FIG. 8, the new-type system information may be divided into minimum system information and other system information. The minimum system information may be periodically broadcasted. The minimum system information may include basic information required for initial access to a cell and information for acquiring any other system information that is provisioned on an on-demand basis or is periodically broadcasted. The minimum system information may include at least one of a SFN, a list of PLMNs, a cell ID, a cell camping parameter, and a RACH parameter. When a network allows an on-demand mechanism, a parameter required to request the other system information may be included in the minimum system information. The other system information may refer to all system information not broadcast in the minimum system information.

A UE may request the network to transmit system information in order to acquire other system information. The other system information may be provided through broadcasting or may be provided through dedicated signaling. When the system information requested by the UE is provided by broadcasting, the UE does not need to switch to the RRC_CONNECTED mode but needs to acquire scheduling information for acquiring the requested system information in order to acquire the requested system information. However, after the UE requests the network to transmit system information, the UE cannot know whether the requested system information is broadcast.

For example, when the network does not broadcast specific system information, the UE in the RRC_IDLE mode may request the specific system information from the network using a RACH procedure. Thereafter, even if the network broadcasts the specific system information for any reason, the UE cannot know whether the specific system information is broadcasted. Therefore, the UE may need to continuously perform the RACH procedure, which is unnecessary, in order to receive the specific system information. Even if the UE has already received the particular system information from the network in the RACH procedure for any reason, the UE may need to continuously perform the RACH procedure, which is unnecessary, until the RACH procedure is completed. This may cause the waste of radio resources. Therefore, it is necessary to propose a method for acquiring system information that is capable of preventing an unnecessary RACH procedure from being performed.

Further, an existing system information change procedure based on a BCCH modification period may cause a delay in acquiring requested system information. The BCCH modification period may be referred to as a system information modification period.

Figure 9:
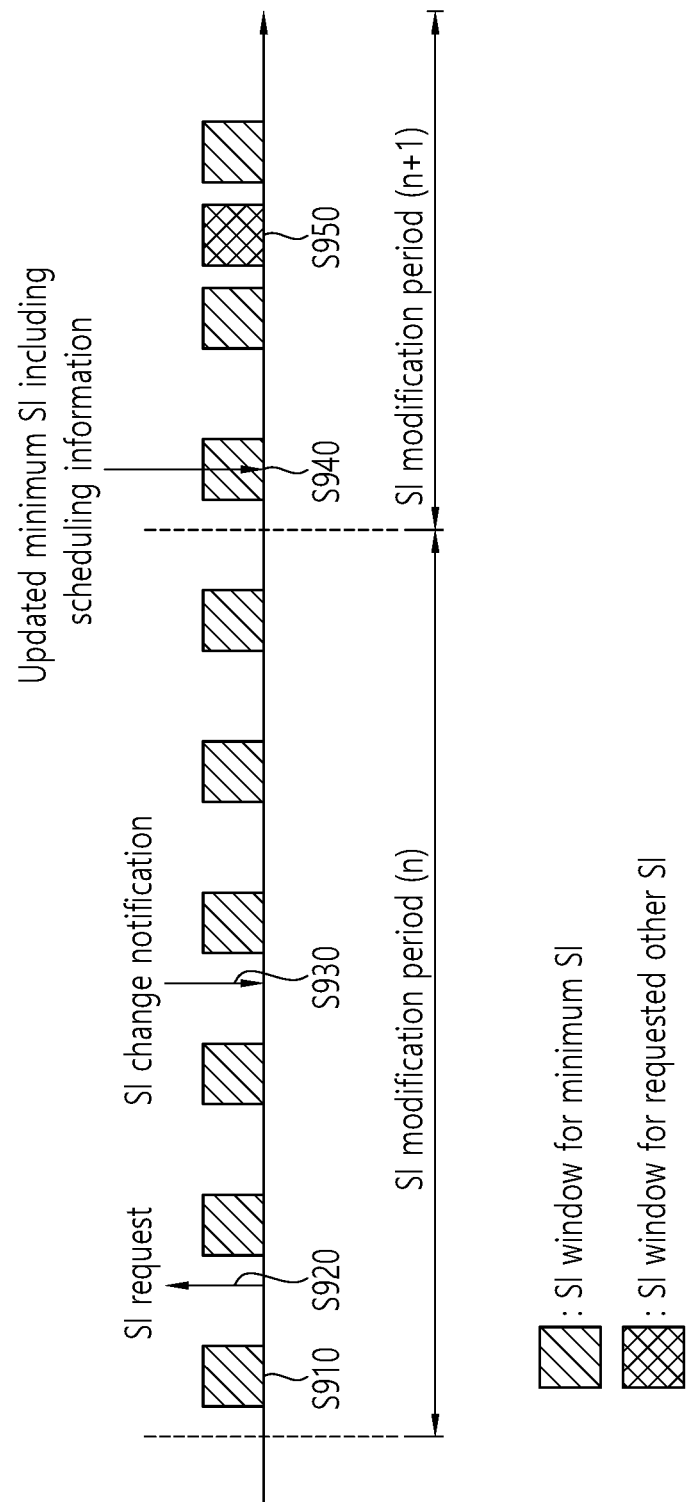
FIG. 9 shows a method for a UE to acquire updated minimum system information on the basis of a system information modification period.

FIG. 9 shows a method for a UE to acquire updated minimum system information on the basis of a system information modification period.

Referring to FIG. 9, in step S910, the UE may acquire minimum system information within the system information (SI) window of the minimum system information. The UE may determine whether specific system information is broadcast on the basis of scheduling information included in the minimum system information. The specific system information may be other system information. When the specific system information is not broadcast, the UE may request the specific system information from a network in step S920. Thereafter, in step S930, the UE may receive a minimum SI change notification. For example, the minimum SI change notification may be received via a paging message. In step S940, the UE may read updated minimum system information in the next system information modification period. In step S950, the UE may acquire the requested specific system information. That is, since the UE can read the updated minimum system information in the next system information modification period, a delay of considerable time may occur until the UE acquires the requested system information. Therefore, it is necessary to propose a minimum system information update mechanism to enable the UE to immediately acquire the requested system information from the network.

Hereinafter, a method for receiving system information and a device supporting the same will be described in detail according to an embodiment of the present invention.

According to the embodiment of the present invention, a UE may initiate an RACH procedure or a system information request procedure in order to request other system information. After requesting system information in the RACH procedure or the system information request procedure, the UE may receive a system information response in response to the system information request in the RACH procedure or the system information request procedure. The system information response may include a broadcast indication and/or a unicast indication. The unicast indication may also be referred to as a dedicated indication. The system information request may be transmitted via a first message, and the system information response may be transmitted via a second message. Alternatively, the system information request may be transmitted via a third message, and the system information response may be transmitted via a fourth message. Alternatively, the system information request may be transmitted via a first message, and the system information response may be transmitted via a fourth message.

For example, when the UE receives a broadcast indication from the network, the UE can know that the requested system information is scheduled to be broadcast in the next SI period. Therefore, the UE may stop the RACH procedure or the system information request procedure. Then, the UE may read minimum system information to receive the requested system information. When the UE receives the broadcast indication from the network, the UE may not perform an RRC state switch to acquire the system information. That is, the UE can receive the requested system information from the network in a broadcast manner without any RRC state switch.

For example, when the UE receives a unicast indication from the network, the UE can know that the requested system information is scheduled to be provided in a dedicated manner after the RACH procedure or the system information request procedure. Thus, the UE may continue and complete the RACH procedure or the system information request procedure. After the RACH procedure or the system information request procedure, the UE may enter the RRC_CONNECTED state to acquire the system information. Then, the UE may receive the requested system information from the network in a dedicated manner.

Figure 10:
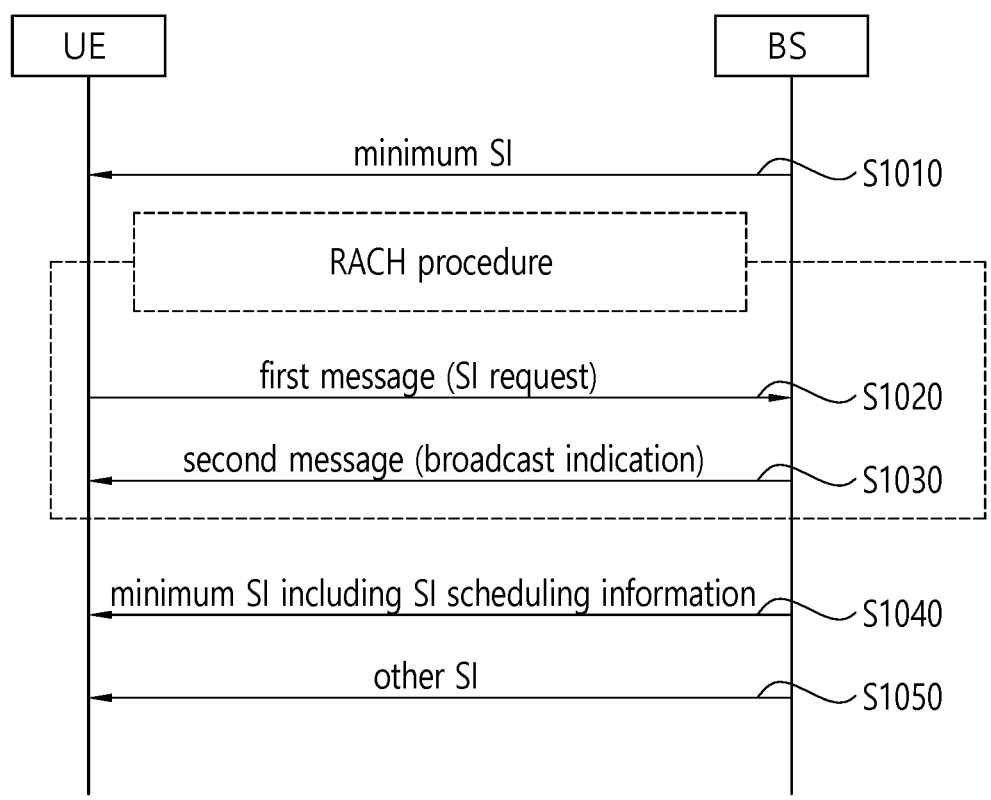
FIG. 10 shows a procedure for requesting other system information on the basis of a broadcast indication according to an embodiment of the present invention.

FIG. 10 shows a procedure for requesting other system information on the basis of a broadcast indication according to an embodiment of the present invention.

Referring to FIG. 10, in step S1010, a UE may receive minimum system information from a network. The UE may determine whether other system information is broadcast on the basis of the minimum system information. When the other system information, which the UE is interested in receiving, is not currently broadcast, the UE may determine to request the other system information. To request system information, the UE may initiate an RACH procedure or a system information request procedure.

In step S1020, the UE may select a first message resource (i.e., preamble) corresponding to the other system information of interest. Then, the UE may transmit a system information request using the selected first message resource.

Additionally, after transmitting the system information request, the UE may start a system information request timer. For example, when the system information request timer expires, the UE may attempt to receive new minimum system information. The new minimum system information may be received via a second message.

In step S1030, the UE may receive the second message including a broadcast indication. Thus, the UE may expect that the requested system information will be broadcast. When the UE receives the broadcast indication indicating that the requested system information is to be broadcasted, the UE may stop the RACH procedure or the system information request procedure. Then, the UE may not transmit a third message. The UE may maintain the current RRC state instead of switching to the RRC_CONNECTED state. For example, the current RRC state may be the RRC_IDLE state or the RRC_INACTIVE state.

In step S1040, the UE may read the minimum system information in the next SI period. The minimum system information may include scheduling information on the requested system information.

In step S1050, the UE may receive the requested system information on the basis of the scheduling information. The requested system information may be received in a broadcast manner.

According to the embodiment of the present invention, the UE can know that specific system information is broadcast and thus may stop an ongoing RACH process for acquiring system information. Therefore, it is possible to avoid the waste of radio resources that may occur by continuously performing an unnecessary RACH procedure.

Figure 11:
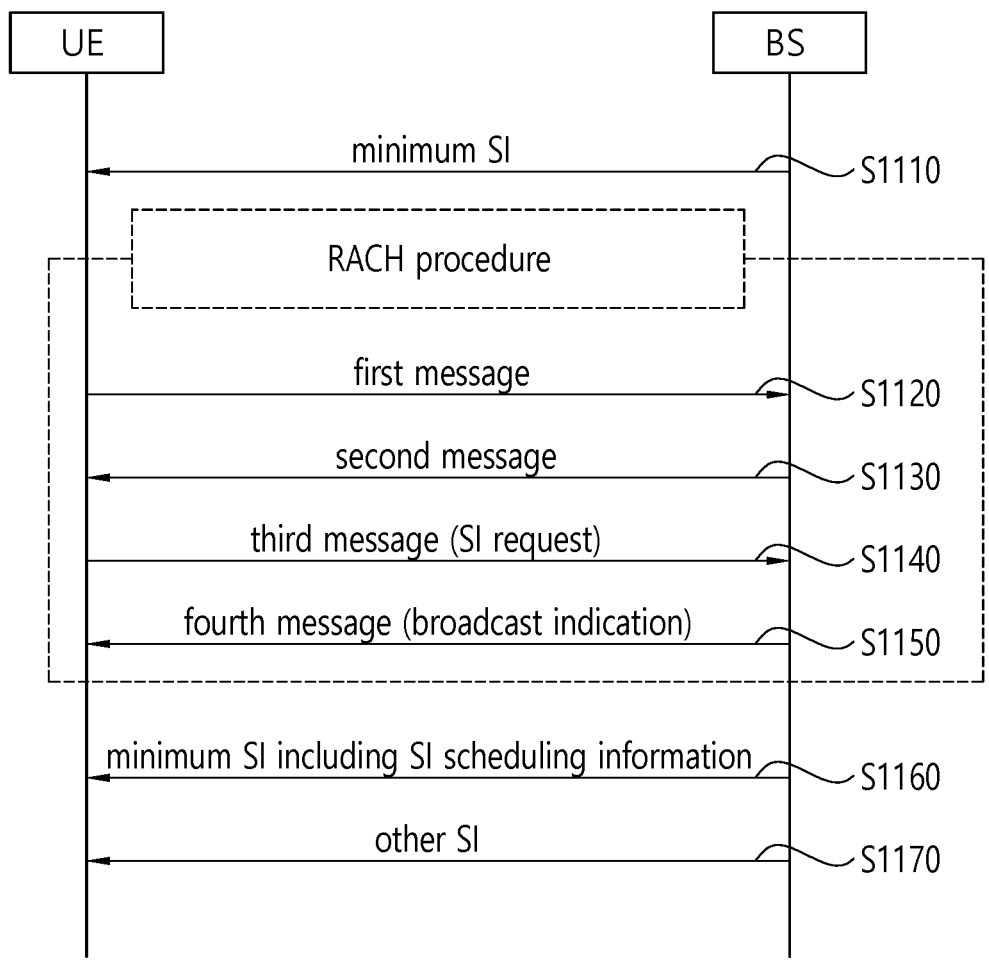
FIG. 11 shows a procedure for requesting other system information on the basis of a broadcast indication according to an embodiment of the present invention.

FIG. 11 shows a procedure for requesting other system information on the basis of a broadcast indication according to an embodiment of the present invention.

Referring to FIG. 11, in step S1110, a UE may receive minimum system information from a network. The UE may determine whether other system information is broadcast on the basis of the minimum system information. When the other system information, which the UE is interested in receiving, is not currently broadcast, the UE may determine to request the other system information. To request system information, the UE may initiate an RACH procedure or a system information request procedure.

In step S1120, the UE may select a first message resource (i.e., preamble) and may transmit the first message.

In step S1130, the UE may receive a second message.

In step S1140, the UE may transmit a system information request to the network using the third message. Additionally, after transmitting the system information request, the UE may start a system information request timer. For example, when the system information request timer expires, the UE may attempt to receive new minimum system information. The new minimum system information may be received via a fourth message.

In step S1150, the UE may receive the fourth message including a broadcast indication. Thus, the UE may expect that the requested system information will be broadcast. When the UE receives the broadcast indication indicating that the requested system information is to be broadcasted, the UE may stop the RACH procedure or the system information request procedure. The UE may maintain the current RRC state instead of switching to the RRC_CONNECTED state. For example, the current RRC state may be the RRC_IDLE state or the RRC_INACTIVE state.

In step S1160, the UE may read the minimum system information in the next SI period. The minimum system information may include scheduling information on the requested system information.

In step S1170, the UE may receive the requested system information on the basis of the scheduling information. The requested system information may be received in a broadcast manner.

According to the embodiment of the present invention, the UE can know that specific system information is broadcast and thus may stop an ongoing RACH process for acquiring system information. Therefore, it is possible to avoid the waste of radio resources that may occur by continuously performing an unnecessary RACH procedure.

Figure 12:
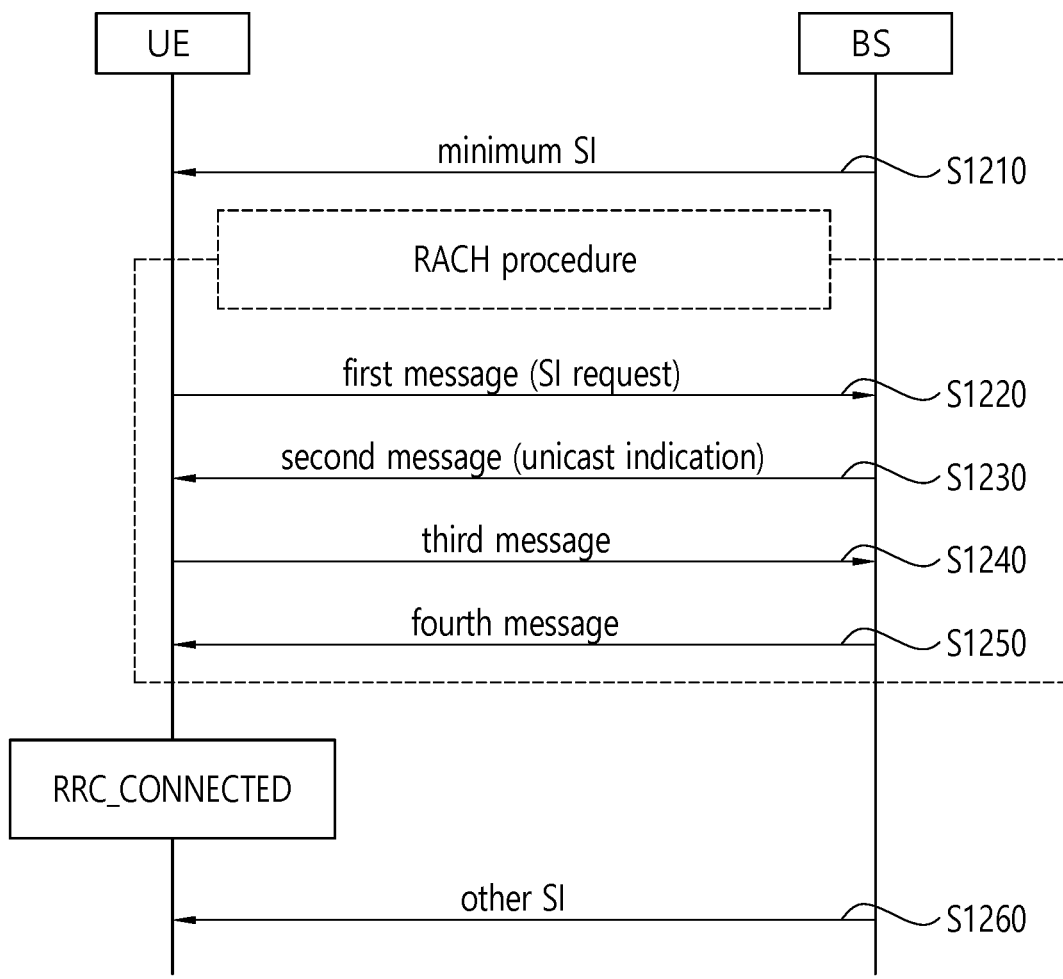
FIG. 12 shows a procedure for requesting other system information on the basis of a unicast indication according to an embodiment of the present invention.

FIG. 12 shows a procedure for requesting other system information on the basis of a unicast indication according to an embodiment of the present invention.

Referring to FIG. 12, in step S1210, a UE may receive minimum system information from a network. The UE may determine whether other system information is broadcast on the basis of the minimum system information. When the other system information, which the UE is interested in receiving, is not currently broadcast, the UE may determine to request the other system information. To request system information, the UE may initiate an RACH procedure or a system information request procedure.

In step S1220, the UE may select a first message resource (i.e., preamble) corresponding to the other system information of interest. Then, the UE may transmit a system information request using the selected first message resource. Additionally, after transmitting the system information request, the UE may start a system information request timer. For example, when the system information request timer expires, the UE may attempt to receive new minimum system information. The new minimum system information may be received via a second message.

In step S1230, the UE may receive the second message including a broadcast indication. Thus, the UE may expect that the requested system information will be provided in a dedicated manner.

In step S1240, the UE may transmit a third message. In step S1250, the UE may receive a fourth message. The UE may complete the RACH procedure or the system information request procedure and may switch to the RRC_CONNECTED state.

In step S1260, the UE may receive the requested system information. The requested system information may be received in the dedicated manner.

Figure 13:
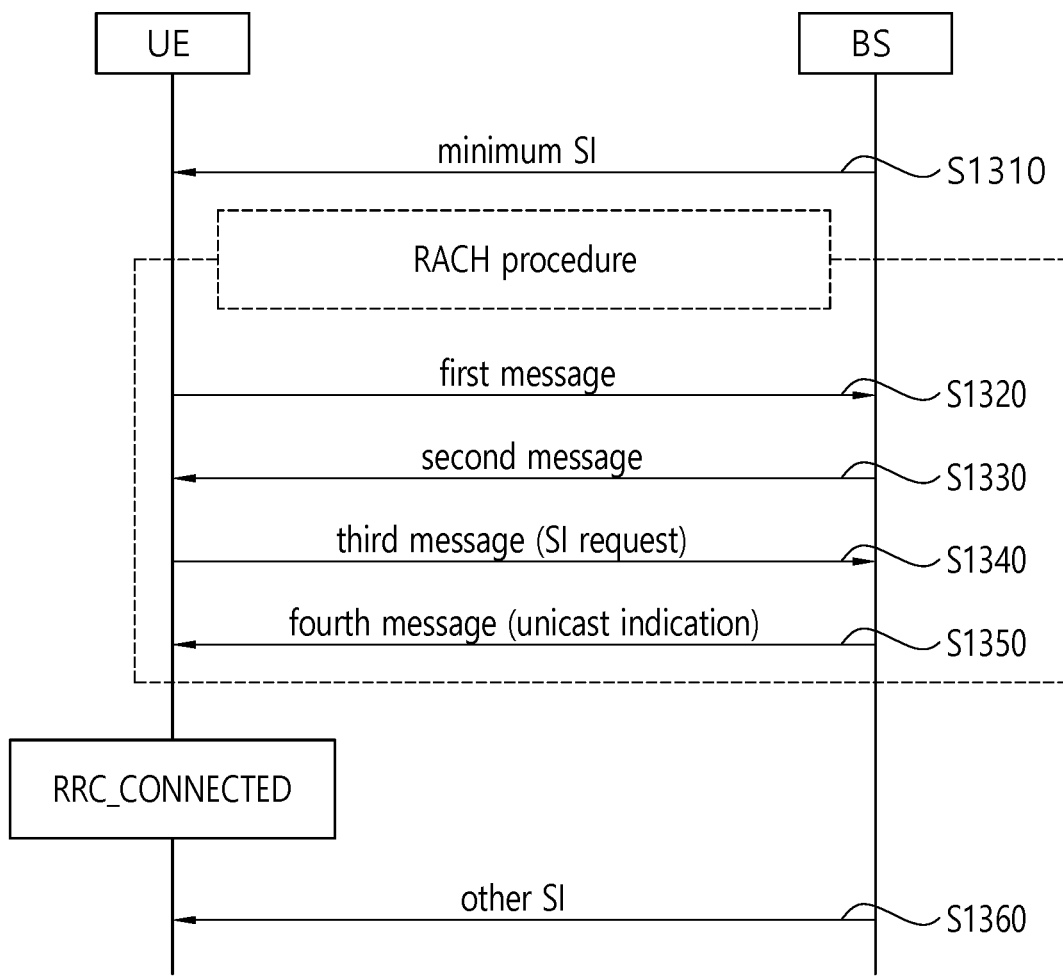
FIG. 13 shows a procedure for requesting other system information on the basis of a unicast indication according to an embodiment of the present invention.

FIG. 13 shows a procedure for requesting other system information on the basis of a unicast indication according to an embodiment of the present invention.

Referring to FIG. 13, in step S1310, a UE may receive minimum system information from a network. The UE may determine whether other system information is broadcast on the basis of the minimum system information. When the other system information, which the UE is interested in receiving, is not currently broadcast, the UE may determine to request the other system information. To request system information, the UE may initiate an RACH procedure or a system information request procedure.

In step S1320, the UE may select a first message resource (i.e., preamble) and may transmit the first message.

In step S1330, the UE may receive a second message.

In step S1340, the UE may transmit a system information request to the network using the third message. Additionally, after transmitting the system information request, the UE may start a system information request timer. For example, when the system information request timer expires, the UE may attempt to receive new minimum system information. The new minimum system information may be received via a fourth message.

In step S1350, the UE may receive the fourth message including a broadcast indication. Thus, the UE may expect that the requested system information will be provided in a dedicated manner. The UE may complete the RACH procedure or the system information request procedure and may switch to the RRC_CONNECTED state.

In step S1360, the UE may receive the requested system information. The requested system information may be received in the dedicated manner.

Figure 14:
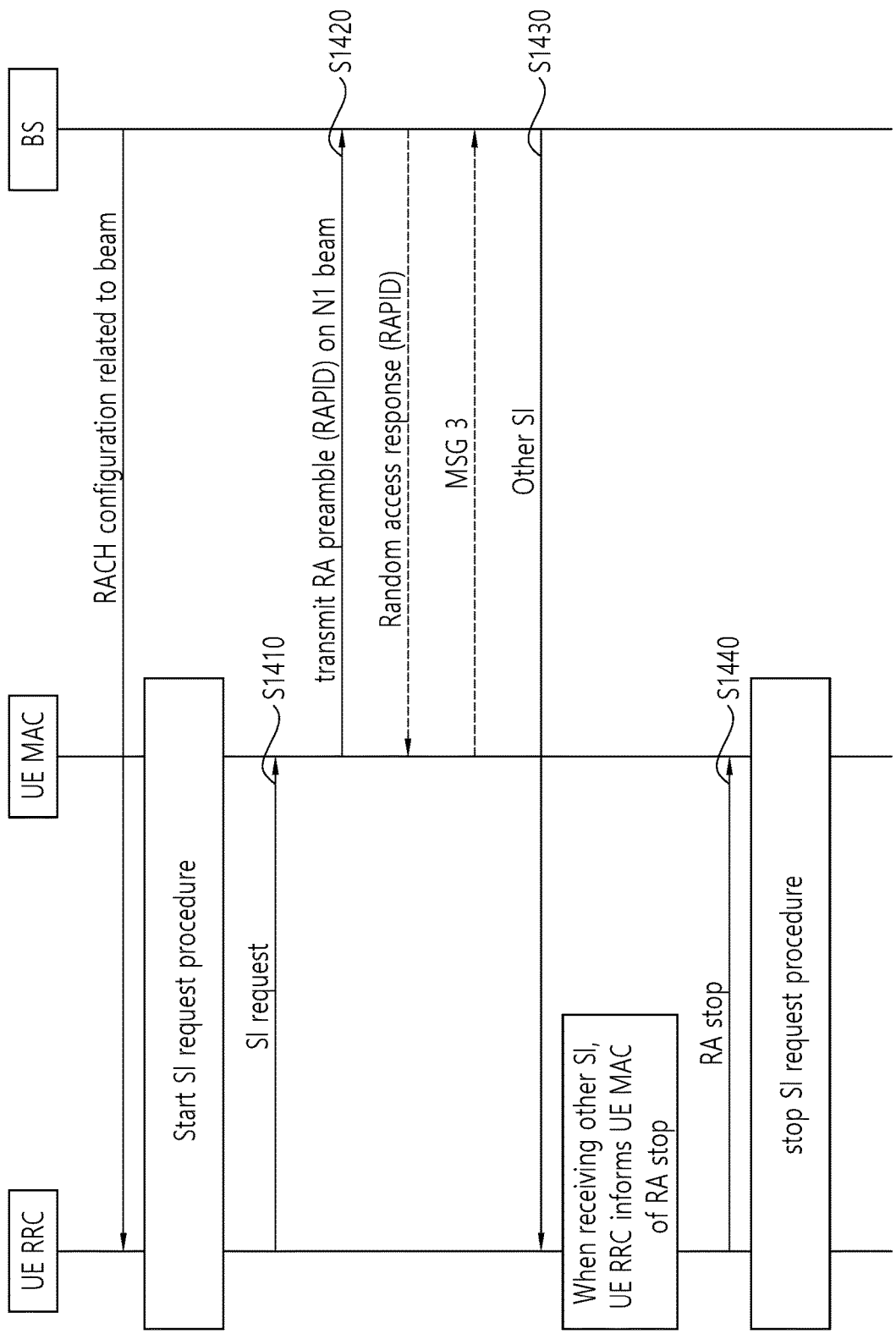
FIG. 14 shows a procedure for requesting other system information according to an embodiment of the present invention.

FIG. 14 shows a procedure for requesting other system information according to an embodiment of the present invention.

Referring to FIG. 14, in step S1410, the RRC layer of a UE may initiate a system information request procedure for one or more system information messages or one or more system information blocks and may trigger a random access procedure to request other system information. Additionally, the RRC layer of the UE may start a timer.

In step S1420, the MAC layer of the UE may transmit any one of random access preambles.

In step S1430, after triggering the random access procedure to request other system information, the RRC layer of the UE may receive the requested other system information (i.e., a system information message or system information block) at any time.

In step S1440, when the RRC layer of the UE receives the requested other system information at any time, the RRC layer of the UE may indicate a stop of the triggered random access procedure to the MAC layer of the UE. When the RRC layer of the UE indicates a stop of the triggered random access procedure to the MAC layer of the UE before the initiated random access procedure is completed, the MAC layer of the UE may stop the triggered random access procedure.

Figure 15:
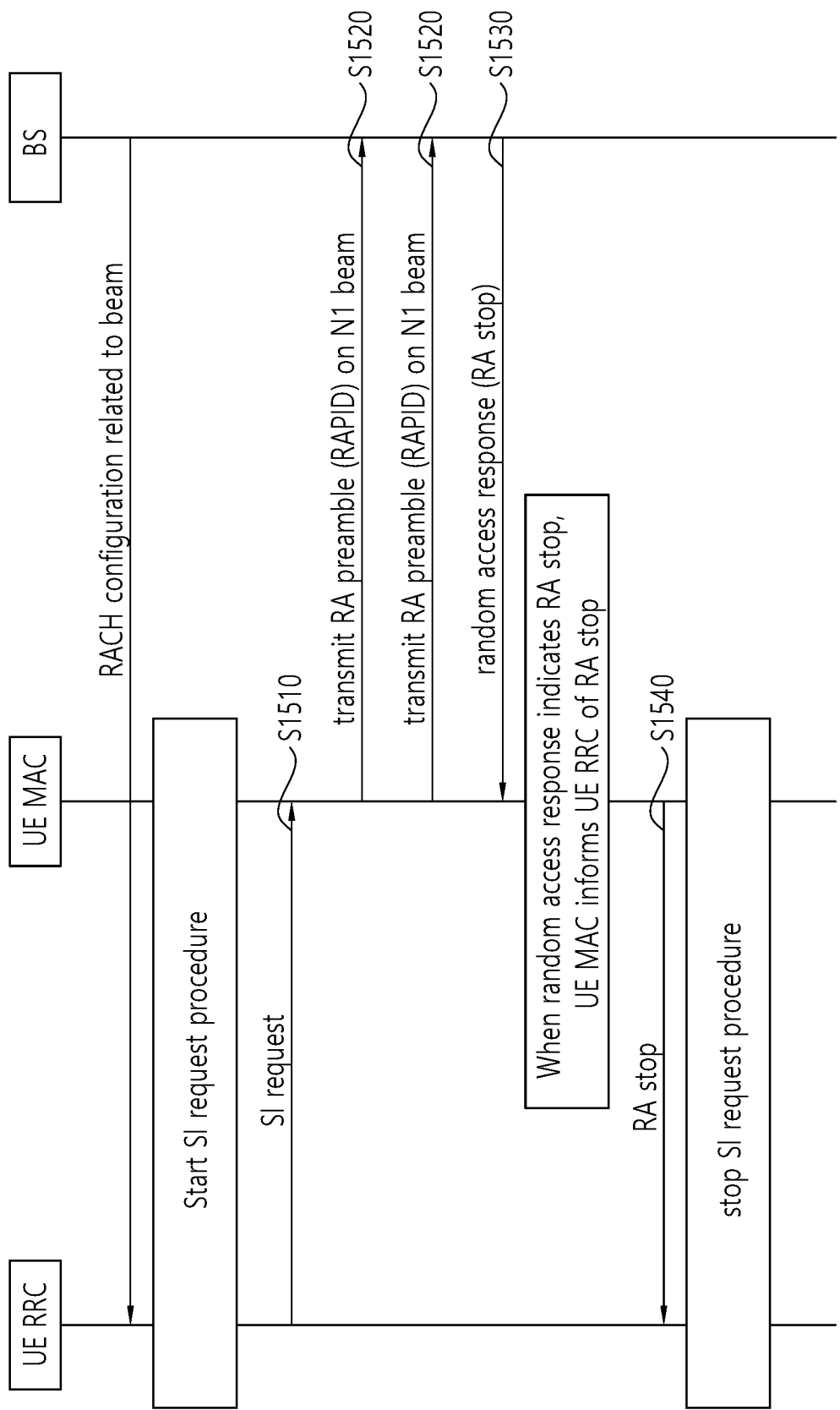
FIG. 15 shows a procedure for requesting other system information according to an embodiment of the present invention.

FIG. 15 shows a procedure for requesting other system information according to an embodiment of the present invention.

Referring to FIG. 15, in step S1510, the RRC layer of a UE may initiate a system information request procedure for one or more system information messages or one or more system information blocks and may trigger a random access procedure to request other system information including one or more random access preambles. Additionally, the RRC layer of the UE may start a timer.

In step S1520, the MAC layer of the UE may transmit any one of the random access preambles.

In step S1530, when the MAC layer of the UE receives a random access response message indicating a stop of the system information request, the MAC layer of the UE may stop the random access procedure. Alternatively, the MAC layer of the UE may consider that the random access procedure is completed. The random access response message indicating the stop of the system information request may explicitly or implicitly indicate the system information messages or the system information blocks.

In step S1540, the MAC layer of the UE may stop the random access procedure and inform the RRC layer of the UE of the stop of the system information request procedure or the random access procedure. Upon being informed of the system information request procedure or the interruption of the random access procedure, the RRC layer of the UE may stop the system information request procedure. Additionally, the RRC layer of the UE may stop the timer.

Figure 16:
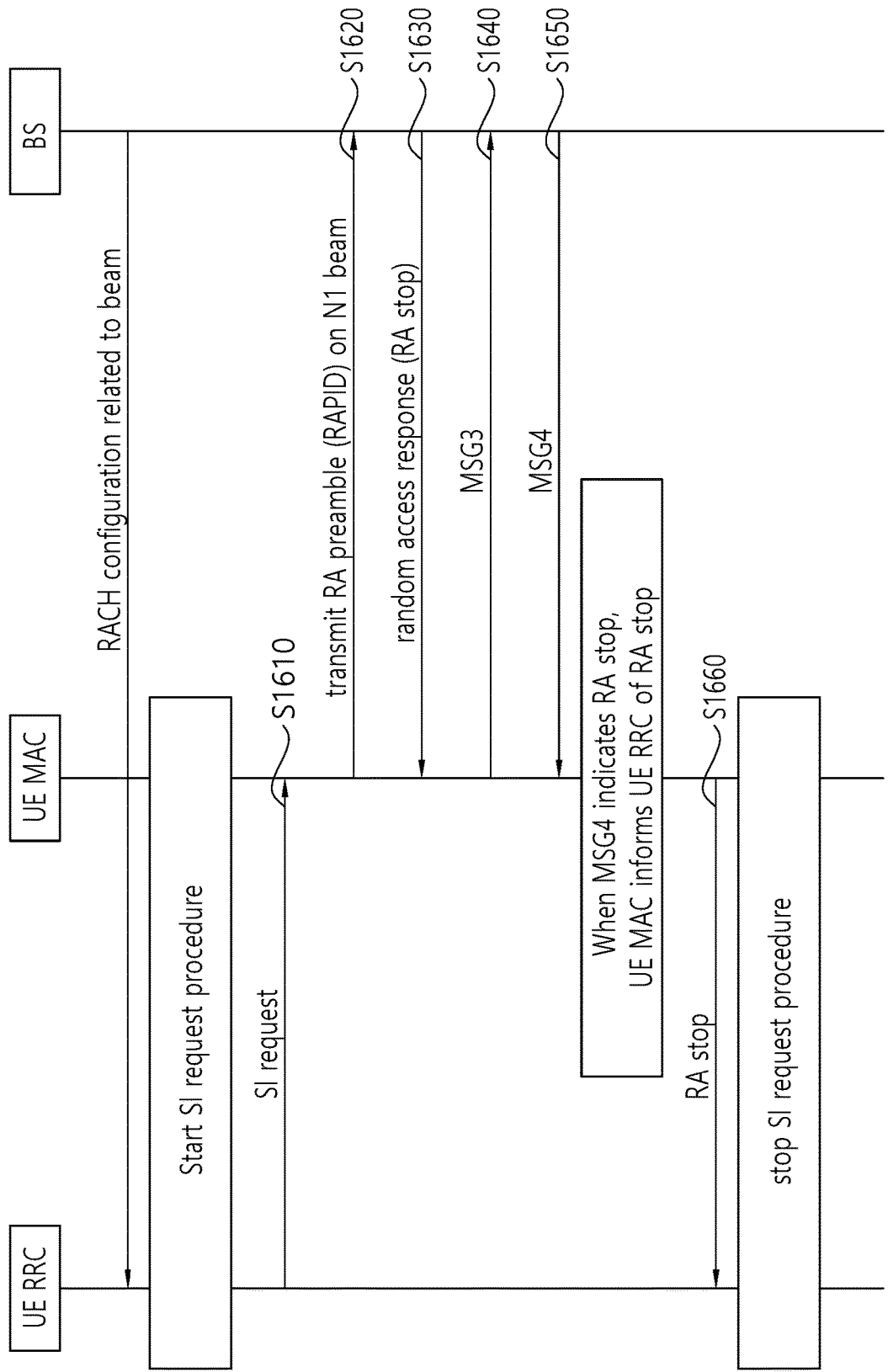
FIG. 16 shows a procedure for requesting other system information according to an embodiment of the present invention.

FIG. 16 shows a procedure for requesting other system information according to an embodiment of the present invention.

Referring to FIG. 16, in step S1610, the RRC layer of a UE may initiate a system information request procedure for one or more system information messages or one or more system information blocks and may trigger a random access procedure to request other system information. Additionally, the RRC layer of the UE may start a timer.

In step S1620, the MAC layer of the UE may transmit any one of random access preambles.

In step S1630, the MAC layer of the UE may receive a random access response message indicating a random access preamble.

In step S1640, the MAC layer of the UE may transmit a third message on a PUSCH using a UL grant included in a random access response message.

In step S1650, when the MAC layer of the UE receives a fourth message indicating a stop of the system information request, the MAC layer of the UE may stop the random access procedure. Alternatively, the MAC layer of the UE may consider that the random access procedure is completed. The fourth message may include at least one of a C-RNTI on a PDCCH of a special cell (SpCell), a minimum system information message, an other system information message, a system information message, and a UE contention resolution identity on a DL-SCH on the PDCCH of the SpCell (Special Cell). The fourth message indicating the stop of the system information request may explicitly or implicitly indicate the system information messages or the system information blocks In step S1660, the MAC layer of the UE may stop the random access procedure and inform the RRC layer of the UE of the stop of the system information request procedure or the random access procedure. Upon being informed of the system information request procedure or the interruption of the random access procedure, the RRC layer of the UE may stop the system information request procedure. Additionally, the RRC layer of the UE may stop the timer.

Figure 17:
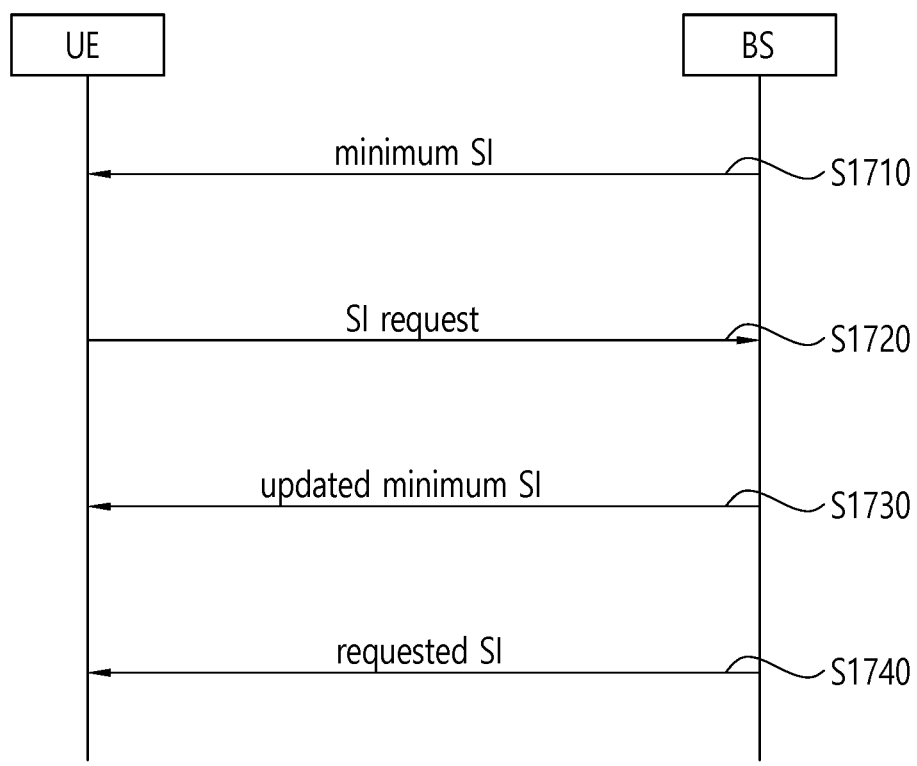
FIG. 17 shows a procedure for a UE to acquire updated minimum system information according to an embodiment of the present invention.

FIG. 17 shows a procedure for a UE to acquire updated minimum system information according to an embodiment of the present invention.

Referring to FIG. 17, in step S1710, the UE may receive minimum system information. The UE may determine other system information that needs to be requested on the basis of the minimum system information.

In step S1720, the UE may transmit a system information request to a network. That is, the UE may request, from the network, the other system information that needs to be requested.

In step S1730, the UE may receive updated minimum system information. According to the embodiment of the present invention, the UE may receive the updated minimum system information using three methods.

According to a first option, after the UE transmits the system information request or receives an indication that the requested system information is to be broadcasted, the UE may read the minimum system information transmits in the next short message system information modification period. In this case, the UE may not receive a system information change notification. Although there is no system information change notification, the UE may expect that the minimum system information will be updated after the system information request. Thus, the UE may read the minimum system information in the next short system information modification period without receiving a system information change notification.

According to a second option, after the UE transmits the system information request or receives an indication that the requested system information is to be broadcasted, the UE may read minimum system information from the next transmission of the minimum system information until scheduling information on the requested system information is included in the minimum system information. That is, the UE may continue to read the minimum system information until the scheduling information on the requested system information is included in the minimum system information.

According to a third option, after the UE transmits the system information request, the UE may start a system information request timer. When the system information request timer expires, the UE may read minimum system information from the first transmission of the minimum system information. When the minimum system information does not include scheduling information on the requested system information, the UE may read minimum system information transmitted next.

In step S1740, when the UE acquires minimum system information including scheduling information on the requested system information, the UE may read the requested system information in the first system information window of the requested system information. Preferably, the change of information other than the scheduling information on the requested system information may not be allowed within the same system information modification period. When the information other than the scheduling information on the other system information is changed, the UE may acquire updated minimum system information according to a legacy system information change procedure. That is, when the information other than the scheduling information on the other system information is changed, the UE may acquire updated minimum system information on the basis of a system information modification period or a system information change notification.

According to the embodiment of the present invention, after requesting system information, the UE does not need to wait until the next system information modification period in order to acquire updated minimum system information including scheduling information on the requested other system information. Further, after requesting the system information, the UE does not need to receive a system information change notification in order to check whether minimum system information is updated. Thus, compared to a conventional procedure, the UE can quickly acquire requested other system information.

FIG. 18 shows a method for a UE to acquire updated minimum system information according to an embodiment of the present invention. Specifically, (a) of FIG. 18 shows a method for a UE to acquire updated minimum system information according to the first option, (b) of FIG. 18 shows a method for a UE to acquire updated minimum system information according to the second option, and (c) of FIG. 18 shows a method for a UE to acquire updated minimum system information according to the third option.

Referring to (a) of FIG. 18, in step S1801, the UE may acquire minimum system information in an SI window for the minimum system information. The UE may determine whether specific system information is broadcast on the basis of scheduling information included in the minimum system information. The specific system information may be other system information. When the specific system information is not broadcast, the UE may request the specific system information from a network in step S1802. The UE may expect that scheduling information on the requested system information will be included in the minimum system information in the next short system information modification period. A configuration of the short system information modification period may be included in the minimum system information. The configuration of the short system information modification period may include the length of the short system information modification period and an offset of the short system information modification period. In step S1803, the UE may read updated minimum system information in the next short system information modification period. In step S1804, the UE may acquire the requested system information.

Referring to (b) of FIG. 18, in step S1811, the UE may acquire minimum system information in an SI window for the minimum system information. The UE may determine whether specific system information is broadcast on the basis of scheduling information included in the minimum system information. The specific system information may be other system information. When the specific system information is not broadcast, the UE may request the specific system information from a network in step S1812. The UE may expect that scheduling information on the requested system information will be immediately included in the minimum system information. In step S1813, the UE may read the minimum system information in the next transmission of the minimum system information. However, it is assumed that the minimum system information has not yet been updated. That is, it is assumed that the minimum system information does not yet include the scheduling information on the requested system information. In step S1814, the UE may re-read minimum system information. The minimum system information re-read by the UE has been updated and may include the scheduling information on the requested system information. In step S1815, the UE may acquire the requested system information.

Referring to (c) of FIG. 18, in step S1821, the UE may acquire minimum system information in an SI window for the minimum system information. The UE may determine whether specific system information is broadcast on the basis of scheduling information included in the minimum system information. The specific system information may be other system information. When the specific system information is not broadcast, the UE may request the specific system information from a network in step S1802. The UE may expect that scheduling information on the requested system information will be immediately included in the minimum system information. Additionally, after requesting the system information, the UE may start a system information request timer. Preferably, the value of the system information request timer may be included in the minimum system information. In step S1823, the system information request timer may expire. After the system information request timer expires, the UE may read minimum system information in the first transmission of the minimum system information in step S1824. The minimum system information has been updated and may include the scheduling information on the requested system information. In step S1825, the UE may acquire the requested system information.

Figure 19:
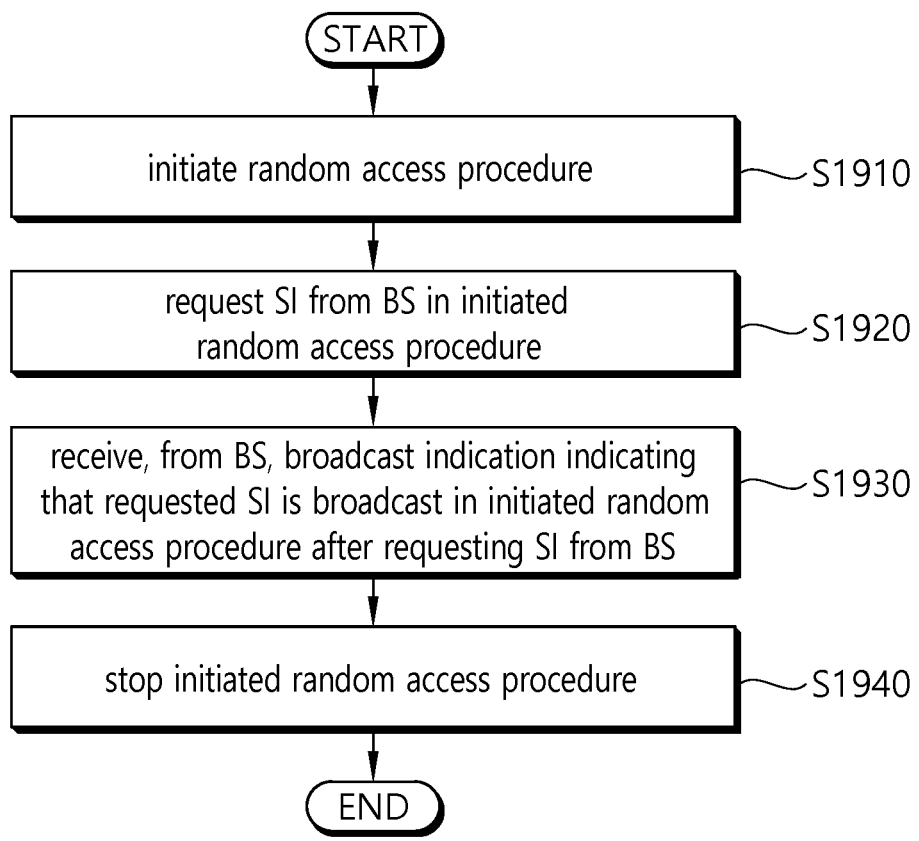
FIG. 19 is a block diagram illustrating a method for a UE to request system information according to an embodiment of the present invention.

FIG. 19 is a block diagram illustrating a method for a UE to request system information according to an embodiment of the present invention.

Referring to FIG. 19, in step S1910, the UE may initiate a random access procedure.

In step S1920, the UE may request system information from a BS in the initiated random access procedure. The system information may be requested from the BS via a random access preamble message. The system information may be requested from the BS via a scheduled transmission message. The system information may be other system information.

In step S1930, after requesting the system information from the BS, the UE may receive, from the BS, a broadcast indication indicating that the requested system information is broadcast in the initiated random access procedure. The broadcast indication indicating that the requested system information is broadcast may be received from the BS via second minimum system information. The second minimum system information may include scheduling information on the requested system information. The broadcast indication may be received from the BS via a random access response message. The broadcast indication may be received from the BS via a collision resolution message.

In step S1940, the UE may stop the initiated random access procedure. After the broadcast indication indicating that the requested system information is broadcast is received from the BS, the initiated random access procedure may be stopped. Alternatively, after the requested system information is received from the BS, the initiated random access procedure may be stopped.

In addition, the UE may receive first minimum system information from the BS. The first minimum system information may indicate that the system information is not broadcast. When the first minimum system information indicates that the system information is not broadcast, the system information may be requested from the BS in the initiated random access procedure.

Further, the UE may receive the requested system information from the BS on the basis of the scheduling information on the requested system information, without changing the RRC state of the UE.

Additionally, after requesting the system information from the BS, the UE may start a system information request timer. In addition, when the system information request timer expires, the UE may receive the second minimum system information from the BS. The broadcast indication indicating that the requested system information is broadcast may be received from the BS via the second minimum system information.

Figure 20:
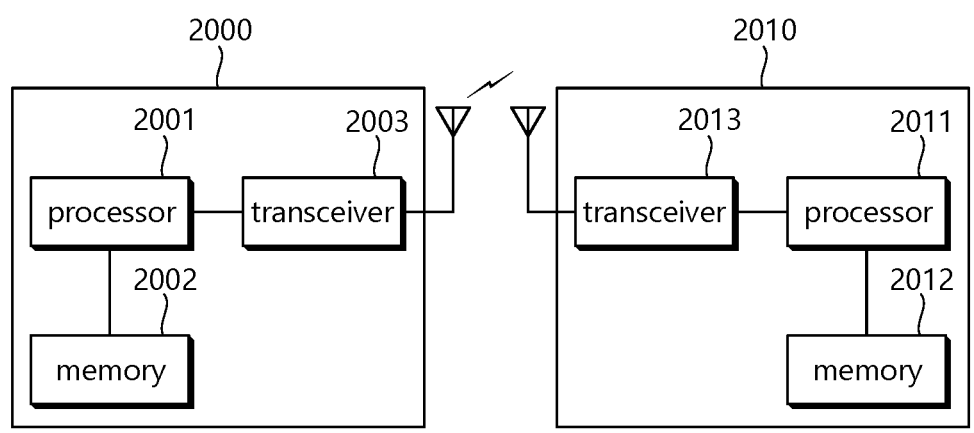
FIG. 20 is a block diagram illustrating a wireless communication system according to the embodiment of the present invention.

FIG. 20 is a block diagram illustrating a wireless communication system according to the embodiment of the present invention.

A BS 2000 includes a processor 2001, a memory 2002 and a transceiver 2003. The memory 2002 is connected to the processor 2001, and stores various information for driving the processor 2001. The transceiver 2003 is connected to the processor 2001, and transmits and/or receives radio signals. The processor 2001 implements proposed functions, processes and/or methods. In the above embodiment, an operation of the base station may be implemented by the processor 2001.

A UE 2010 includes a processor 2011, a memory 2012 and a transceiver 2013. The memory 2012 is connected to the processor 2011, and stores various information for driving the processor 2011. The transceiver 2013 is connected to the processor 2011, and transmits and/or receives radio signals. The processor 2011 implements proposed functions, processes and/or methods. In the above embodiment, an operation of the UE may be implemented by the processor 2011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device operating in a wireless communication system, the method comprising:

triggering a random access procedure for a system information request;

transmitting, to a base station (BS), a random access preamble for the system information request;

receiving, from the BS, a random access response in response to the random access preamble for the system information request, wherein the random access procedure for the system information request is considered as completed based on the random access response; and receiving, from the BS, system information requested by the system information request, wherein an acknowledgement of the system information request is informed by a media access control (MAC) layer of the wireless device to a radio resource control (RRC) layer of the wireless device based on the random access response.

2. The method of claim 1, wherein the RRC layer of the wireless device triggers the MAC layer of the wireless device to initiate the random access procedure for the system information request.

3. The method of claim 1, wherein the random access response includes the system information requested by the system information request.

4. The method of claim 1, wherein the system information is received without changing an RRC state of the wireless device.

5. The method of claim 1, wherein the random access procedure for the system information request is stopped based on the random access response.

6. The method of claim 1, further comprising receiving, from the BS, a random access channel (RACH) configuration.

7. The method of claim 6, wherein the random access preamble for the system information is transmitted based on the RACH configuration.

8. A wireless device configured to operate in a wireless communication system, the wireless device comprising:
at least one transceiver;
at least one processor; and
at least one computer memory operably connectable to the at least one processor and storing instructions that, based on being executed by the at least one processor, perform operations comprising:
triggering a random access procedure for a system information request;
transmitting, to a base station (BS) through the transceiver, a random access preamble for system information request;
receiving, from the BS through the transceiver, a random access response in response to the random access preamble for the system information request, wherein the random access procedure for the system information request is considered as completed based on the random access response; and
receiving, from the BS through the transceiver, system information requested by the system information request, wherein an acknowledgement of the system information request is informed by a media access control (MAC) layer of the wireless device to a radio resource control (RRC) layer of the wireless device based on the random access response.

9. The wireless device of claim 8, wherein the RRC layer of the wireless device triggers the MAC layer of the wireless device to initiate the random access procedure for the system information request.

10. The wireless device of claim 8, wherein the random access response includes the system information requested by the system information request.

11. The wireless device of claim 8, wherein the system information is received without changing an RRC state of the wireless device.

12. The wireless device of claim 8, wherein the random access procedure for the system information request is stopped based on the random access response.

13. The wireless device of claim 8, wherein the operations further comprise receiving, from the BS, a random access channel (RACH) configuration.

14. The wireless device of claim 13, wherein the random access preamble for the system information is transmitted based on the RACH configuration.

15. A processing apparatus for a wireless device configured to operate in a wireless communication system, the processing apparatus comprising:
at least one processor; and
at least one computer memory operably connectable to the at least one processor and storing instructions that, based on being executed by the at least one processor, perform operations comprising:
triggering a random access procedure for a system information request;
transmitting, to a base station (BS), a random access preamble for system information request;
receiving, from the BS, a random access response in response to the random access preamble for the system information request, wherein the random access procedure for the system information request is considered as completed based on the random access response; and
receiving, from the BS, system information requested by the system information request, wherein an acknowledgement of the system information request is informed by a media access control (MAC) layer of the wireless device to a radio resource control (RRC) layer of the wireless device based on the random access response.

* * * * *